United States Patent [19]

Heule

[11] Patent Number: 5,755,538

[45] Date of Patent: May 26, 1998

[54] DEBURRING TOOL

[76] Inventor: Ulf Heule, Jacob-Schmid-Heinrich-St. 12, CH-9436 Balgach, Switzerland

[21] Appl. No.: 621,314

[22] Filed: Mar. 25, 1996

[51] Int. Cl.[6] .................................................. B23B 51/00
[52] U.S. Cl. ...................................... 408/154; 408/211
[58] Field of Search ............................ 408/93, 94, 153, 408/154, 155, 156, 158, 159, 181, 211, 224, 147, 199

[56] References Cited

U.S. PATENT DOCUMENTS

| 2,228,498 | 1/1941 | Young | 408/158 |
| 2,773,402 | 12/1956 | Edens | 408/154 |
| 3,973,861 | 8/1976 | Sussmuth | 408/154 |
| 4,844,670 | 7/1989 | Heule | 408/224 |

FOREIGN PATENT DOCUMENTS

| 16744 | 10/1980 | European Pat. Off. | 408/156 |
| 3410967 | 10/1985 | Germany | 408/158 |
| 122387 | 4/1958 | U.S.S.R. | 408/211 |

*Primary Examiner*—Daniel W. Howell
*Attorney, Agent, or Firm*—Kilpatrick Stockton; John M. Harrington

[57] ABSTRACT

Deburring tool with a seal in the tool holder for remove burrs and rough edges from the opening edges of bore holes, has a shank and two cutting elements opposing each other with a single spring pointed from a radial guiding cavity of the shank projecting, against the force between this spring with adjustable and limited movable cutting element with a slanted edge which is opposed in the advance direction; whereby, a blade, in a radial externally sealed window of the tool holder against the force of the spring and linearly perpendicular to the tool longitudinal axis, is slidable. The advantage of this innovative deburring tool is that there can be only a single blade in and all around the sealed radial window on the tool element, and that in the tool element itself no built-ins are necessary for mechanical adjustments.

14 Claims, 2 Drawing Sheets

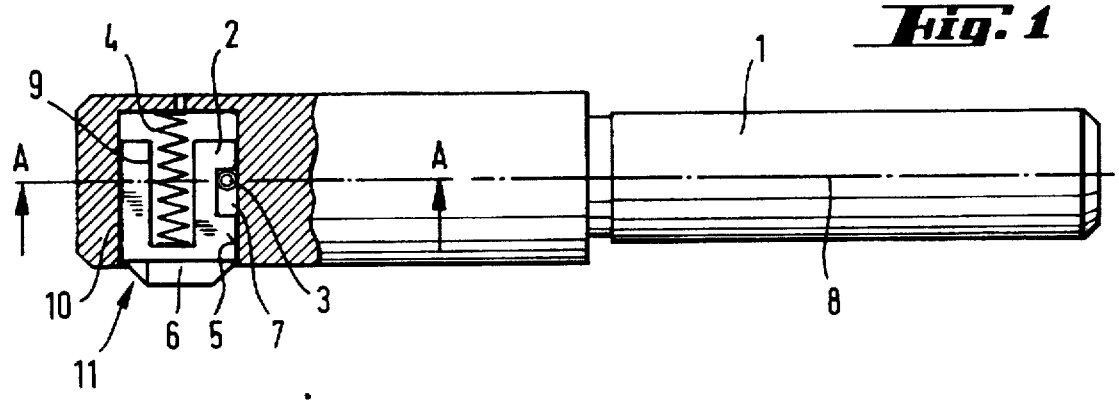
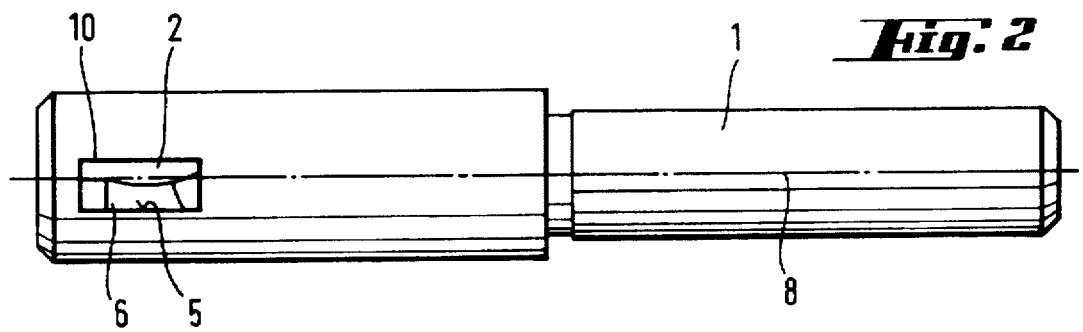
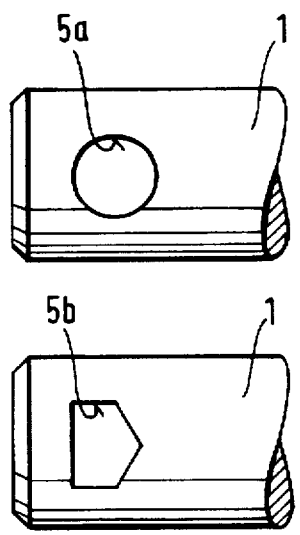
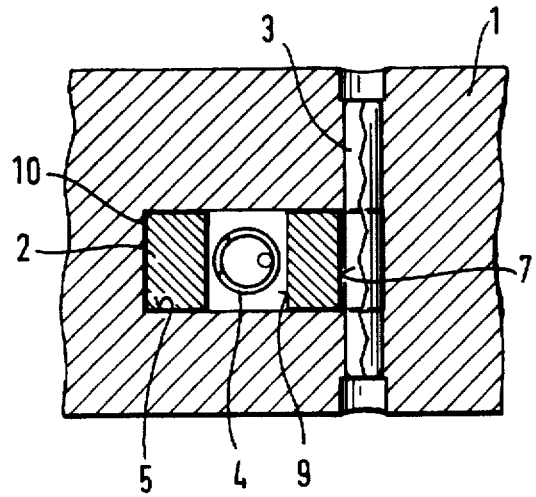

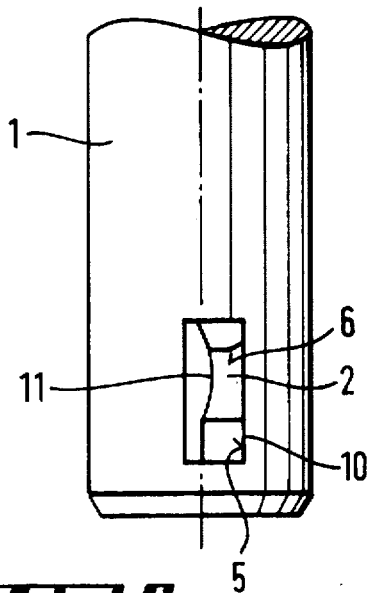
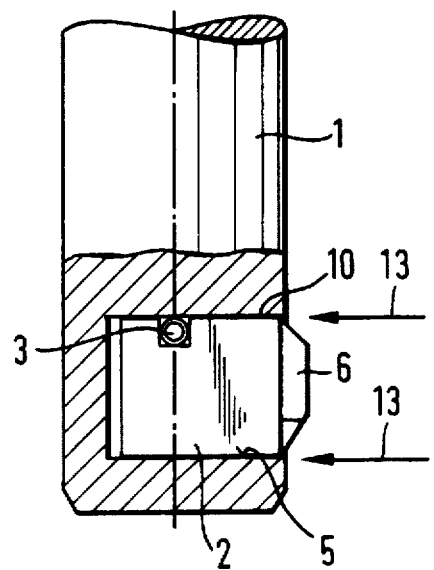
Fig. 6
Fig. 7
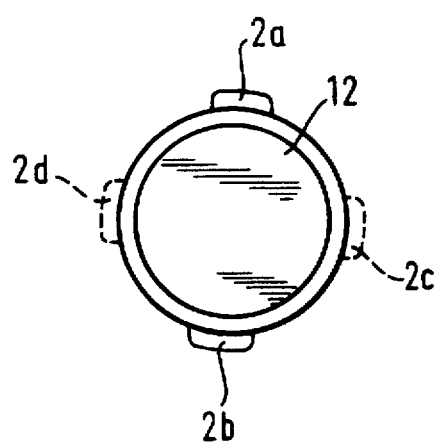
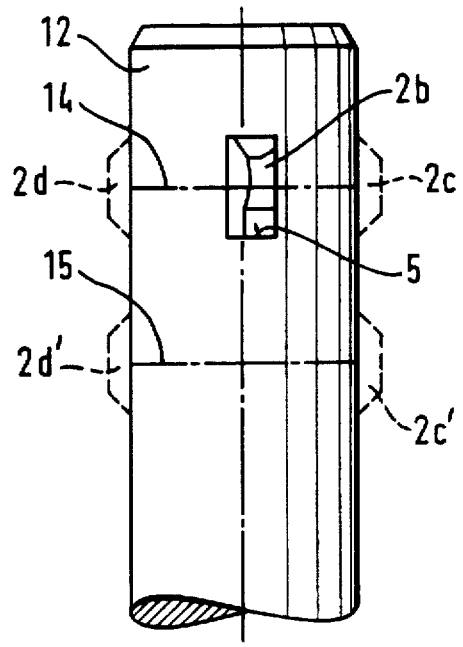
Fig. 8
Fig. 9

DEBURRING TOOL

The invention concerns a deburring tool with a sealing in the tool holder which removes burrs and rough edges from the opening edges of bore holes.

Another tool of this type used to remove chips and shavings from the opening edges of bore holes is, for example, made known with the subject matter of DE 24 07 269 A1. This document characterizes it as having, in its radial guide cavity of the tool holder, projecting from the radial guide cavity two opposingly placed blades which are supported by a single spring. A tool of this type can, for example, be used for one or two sided deburring of through bore holes; whereby, the cutting element, corresponding to the purpose of the application, is provided only with one-sided or with one two-sided functioning cutting edge.

With this known deburring tool, that has blades which are opposingly placed to one another and are supported by a common spring, the basic disadvantage is that there is no sealed blade guide in the tool element, and because of the aforedescribed blade system/construction, the relatively large window can become clogged with chips and shavings. This results in additional cleaning expenses and a decrease in the effectiveness of production time.

This innovation is, therefore, based on the task of further developing and improving the aforementioned deburring tool, so that it is simple and, therefore, operationally reliable with its advantageous technology in the tool holder.

A fundamental feature of the invention is that at least one blade is held in a radially, outwardly sealed window in a tool holder. In this way the blade is sealed all the way around in the window and this prevents chips, shavings and other foreign materials from reaching through the opening in the window to the inner space of the blade holding device in the tool holder.

The invention has, hereby, basically two different embodiments: In the first embodiment, the blade is guided slidable in the tool holder and can, accordingly, be moved in or out by a radial sliding or swinging out of the window of the tool holder. It is important with this embodiment that the best possible thick seal between the outermost area of the blade and the inner area of the window is achieved. This seal should, on the one hand, assure a friction free movement of the blade in the window, and, on the other hand, must protect, as well as possible, against foreign substances from penetrating the sliding guide of the blade in the tool holder. So it appears here that a sliding guide of this type should be designed as a "clearance fit," that is, a clearance between the blade and the inner edge of the window shall be provided, preferably in the range of dimensions from 0.1 mm to 0.01 mm. This clearance guarantees, on the one hand, a friction free sliding of the blade in the window, and, on the other hand, a good sealing which prevents the penetration of chips and shavings, which the deburring blade peels and casts off with its cutting edge from the bore hole edge.

In the second embodiment, the blade is fixed (that is, not movable) in the corresponding receptacle in the tool holder. However, the blade is exchangeable, so that here too, according to the technical precepts of the invention, a complete "all around" sealing of the blade in the window of the tool holder is given.

Relating to the matter of the first embodiment concerning a slidable blade, the following annotations apply.

The advantage of one single cylindrical blade and a single spring support of the existing deburring tool is that the shaping of the window is so matched that an advantageous, expedient, clearance free, or at least, less clearance in the slide guide results in chips and shavings having no access to the inner space of the window.

It is advantageous that the cutting element, equipped with an insertable blade which projects from the tool holder and is spring loaded in the window, has a lateral groove which is perpendicular to its longitudinal axis. In the area of this groove, a tension pin, which is perpendicular to the longitudinal axis of the blade holder in the tool holder, engages and is fixed by the size of the groove in the blade's sliding direction of the blade-sliding movement in the window's sliding direction.

Furthermore, it is essential to the invention, that the spring (which is preferably a compression spring) on the rear wall of the window is fastened so that it engages in a corresponding rear groove in the blade element.

In a first embodiment it is provided that the deburring tool is made with more than one spring loaded blade. For example, there may be two or more opposingly located spring loaded blades.

In still another embodiment, the blade is able to swing out by a swinging guide from the tool holder in the working position.

This advantageous principle of this invention refers briefly in a recapitulatory manner to a radial window which is in the tool element In this radial window the blade is placed one-sided and is sealed all around and is clearance free, so that the blade projects with its cutting element out of the tool element and can be inserted spring loaded. The advantage of the system of the invention is that at least one blade is in a radial window on the tool element, and that in the tool element itself, not any built-ins are necessary for an mechanical adjustments. For this, the window has a clearance fit which prevents chips and shavings from penetrating into its inner space.

The invention related objectives of the submitted invention result from not only the matter of the particulars of the protection claims, but also the various combinations of the individual protection claims. All records, documents and evidence, inclusive of the abstract, open and disclosed statements and declarations and indications and features, especially those represented embodiments in the drawings, will be claimed as fundamental and significant inventions, as far as the claims individually or in combinations are relative to the position that the technology is new. The invention at hand will be explained more precisely by the various embodiments shown by the representational drawings. Hereby, additional significant features and advantages of the innovation will be concluded from the designs and their descriptions.

FIG. 1: top view of a partially cut-away tool holder with schematic blade and spring lay-out;

FIG. 2: top view of a tool holder with the window lay-out;

FIG. 3: sectional representation of FIG. 1 in area A—A;

FIG. 4: a modified embodiment of a window;

FIG. 5: another modified embodiment of a window;

FIG. 6: the side view of a tool holder with fixed blade;

FIG. 7: the section through the lay-out according to FIG. 6;

FIG. 8: the top view of a tool holder with embodiment of two or four blades;

FIG. 9: side view of FIG. 8 with embodiment of various possibilities of blade lay-outs FIG. 1 is a tool holder (1) rotatable around an axis (8) that has a slidable blade with a cutting element (6) in the front tool area in a radial window (5) loaded by a spring (4) linearly perpendicular to the tool longitudinal axis (8).

The blade (2) is designed with a lateral groove (7) which is located perpendicular to its longitudinal axis. In the area of the groove (7) a tension pin (3) is engaged perpendicular to the cutting element—longitudinal axis and flush in the tool holder (1) and is fixed by the size of this groove (7) in the blade—sliding direction of the blade (2)—sliding path in the window—sliding direction.

The spring (4) supporting the blade is (2) is formed preferably as a compression spring.

Furthermore, it is evident that the sliding guided blade (2) in the radial window (5) held by the spring (4) linearly perpendicular to the tool longitudinal axis (8) is adapted clearance free to the shape of the window (5), and the fixed spring (4) on the rear wall of the window (5) in a corresponding rear groove (9) of the blade (2) is engaged spring-loaded.

A schematic front view of the window (5) with an outwardly occluding clearance fit (10) and the placement of the window (5) in the front axis area of the tool holder (1) is inferred in FIG. 2. The clearance fit (10) of the window (5) prevents the penetration of interfering chips and shavings in the window inner area while the tool is being utilized.

FIG. 3 illustrates the design and location of the interior of the window (5) in the area of the lateral groove (7) of the blade-engaging tension pin (3). The tension pin (3) occludes flush thereby with the underside of the tool holder (1).

From the window (5) of the tool holder (1), the guided blade, projecting and spring-loaded in the window (5) of the tool holder (1), is insertable and is sealed all around in the window (5) of the tool holder (1), which has a special cutting element (6); whereby, the one cutting edge (11) of the cutting element (6) is formed forwards non cutting, so that it first cuts when the blade (2) is inserted in the material to be cut and is reversed.

This special design of the cutting element (6) with a forward cutting edge and a forward non cutting edge (11) guarantees the processing of the material to be cut, as well as the advance feed and also the reverse of the blade (2) in or out of the material to be cut.

It is not shown in the drawing that instead of a linear sliding guide of the blade in the tool holder (1), there can be a swinging guide. Hereby, the blade (2) can swing out of or into a working position by a swinging guide from the tool holder (1).

The FIGS. 4 and 5 show that there can also be, instead of a right angle shaped window (5), a circular window (5a) or a triangular window (5b) in the tool holder. The FIGS. 6 and 7 show a fixed, but interchangeable blade (2) which is held in a tool holder (1). With this embodiment also, due to the interchangeability of the blade, care must be taken that during the operation, no chips and shavings in arrow direction 13 penetrate through the window (5) in the holding devices of the blade (2) in the tool holder.

The FIGS. 8 and 9 show various possibilities for fastening several blades (2a–2d) in a tool holder (12). According to FIG. 8, it is preferred that when there are two blades (2a, 2b), these lie diametrically opposed. If there are three or four blades, then these are distributed (equi-circumferential) evenly around the tool holder.

The FIG. 9 shows how one or more blades (2a–2d) are placed on a single common periphery (15) on the tool/holder. The dashed lines on the drawing show that one or more blades (2c', 2d') can also be arranged on another periphery (15).

Drawings Legend

1. Tool holder
2. Blade 2a, 2b, 2c, 2d
3. Tension pin
4. Spring
5. Window 5a, 5b
6. Cutting element
7. Groove
8. Longitudinal axis
9. Groove
10. Clearance fit
11. Cutting edge
12. Tool holder
13. Arrow direction
14. Periphery
15. Periphery

What is claimed is:

1. A deburring tool for removing burrs and rough edges from openings of bore holes, comprising:

a tool holder with forward and rearward ends and portions defining a window; and a blade located within the window and having a cutting edge facing the rearward end of the tool holder, the blade and window having surfaces confronting one another in substantially sealing relationship.

2. The deburring tool according to claim 1, wherein the blade is slideable between a retracted position and an extended position in the window.

3. The deburring tool according to claim 1, wherein the blade is held in fixed relationship to the window by a tension pin disposed in the window.

4. The deburring tool according to claim 1, wherein the blade substantially occludes the window.

5. The deburring tool according to claim 1, wherein the window is substantially rectangular.

6. The deburring tool according to claim 1, wherein the window is substantially circular.

7. The deburring tool according to claim 1, wherein the window is substantially triangular.

8. The deburring tool according to claim 2, wherein the blade is elongate with a longitudinal axis and includes portions defining a lateral groove extending perpendicular to the longitudinal axis of the blade which limits sliding movement of the blade within the window.

9. The deburring tool according to claim 1, wherein the blade has a non-cutting edge facing the forward end of the tool holder.

10. The deburring tool according to claim 2, further comprising a compression spring disposed in the window which biases the blade toward the extended position.

11. The deburring tool according to claim 10, wherein the blade includes portions defining a rear groove and the window includes a rear wall, and the compression spring is disposed in the rear groove and fastened to the rear wall of the window.

12. The deburring tool according to claim 1, further comprising a plurality, of said windows and a plurality of said blades.

13. The deburring tool according to claim 12, wherein said tool holder has a plurality of circumferential peripheries, and said plurality of windows are spaced from one another on one of the circumferential peripheries of the tool holder.

14. The deburring tool according to claim 13, wherein said plurality of windows are located on a plurality of said circumferential peripheries of said tool holder.

* * * * *